United States Patent [19]

Lindenmayer et al.

[11] 4,345,965
[45] Aug. 24, 1982

[54] METHOD AND APPARATUS FOR MAKING TWO COMPONENT MOULDINGS

[75] Inventors: Bernhard Lindenmayer, Hessheim; Lothar Fink, Achim, both of Fed. Rep. of Germany

[73] Assignee: Kloeckner-Werke AG, Duisburg, Fed. Rep. of Germany

[21] Appl. No.: 63,886

[22] Filed: Aug. 3, 1979

[30] Foreign Application Priority Data

Aug. 4, 1978 [DE] Fed. Rep. of Germany ....... 2834211

[51] Int. Cl.³ ...... B29C 3/02; B29G 3/00; B29H 3/08
[52] U.S. Cl. .................................. 156/500; 156/581; 425/520; 425/185; 425/190; 425/572; 425/575; 425/576; 425/588; 425/589
[58] Field of Search ........................................ 425/110, 425/116, 125, 127, 129 R, 235, 259, 542, 361, 572, 574, 576, 581, 588, 589, 338, 406, 117, 120, 126 R, 134, 177, 182, 185, 186, 188, 190, 234, 543, 573, 261, 257, 353, 411, 422, 339.4, 37, 447, 340, 451.9, 575, DIG. 201, 453, 527, 408, 258; 219/126, 129, 130, 120, 160–162; 164/303–312, 323, 325, 326, 328; 100/223; 264/255, 259, 248, 263

[56] References Cited

U.S. PATENT DOCUMENTS

| | | | |
|---|---|---|---|
| 1,400,146 | 12/1921 | Eggers et al. | 264/248 |
| 2,347,600 | 4/1944 | Goode | 425/338 |
| 2,699,573 | 1/1955 | Roach | 425/411 |
| 2,983,953 | 5/1961 | Borah | 425/411 |
| 3,068,512 | 12/1962 | Van Houten | 425/411 |
| 3,140,513 | 7/1964 | Campbell et al. | 425/411 |
| 3,204,292 | 9/1965 | Schon | 425/411 |
| 3,307,220 | 3/1967 | Underwood | 425/411 |
| 3,506,061 | 4/1970 | Clemm | 249/126 |
| 3,659,997 | 5/1972 | Rees | 425/589 |
| 3,771,438 | 11/1973 | Radakovich | 100/223 |
| 3,825,457 | 7/1974 | Holroyd et al. | 264/248 |
| 3,832,437 | 8/1974 | Taylor | 264/248 |
| 3,973,892 | 8/1976 | Rees | 425/572 |
| 4,025,268 | 5/1977 | Taylor | 425/258 |

FOREIGN PATENT DOCUMENTS 316516 11/1971 U.S.S.R. .............................. 100/918

Primary Examiner—Willard E. Hoag
Attorney, Agent, or Firm—Sughrue, Mion, Zinn, Macpeak and Seas

[57] ABSTRACT

Composite moulded rubber or plastic articles, each comprising two distinct parts separately formed by injection moulding of different materials and subsequently joined together by vulcanising or the like, are produced in a dual purpose apparatus that simultaneously moulds two separate parts and bonds together two previously moulded parts.

15 Claims, 16 Drawing Figures

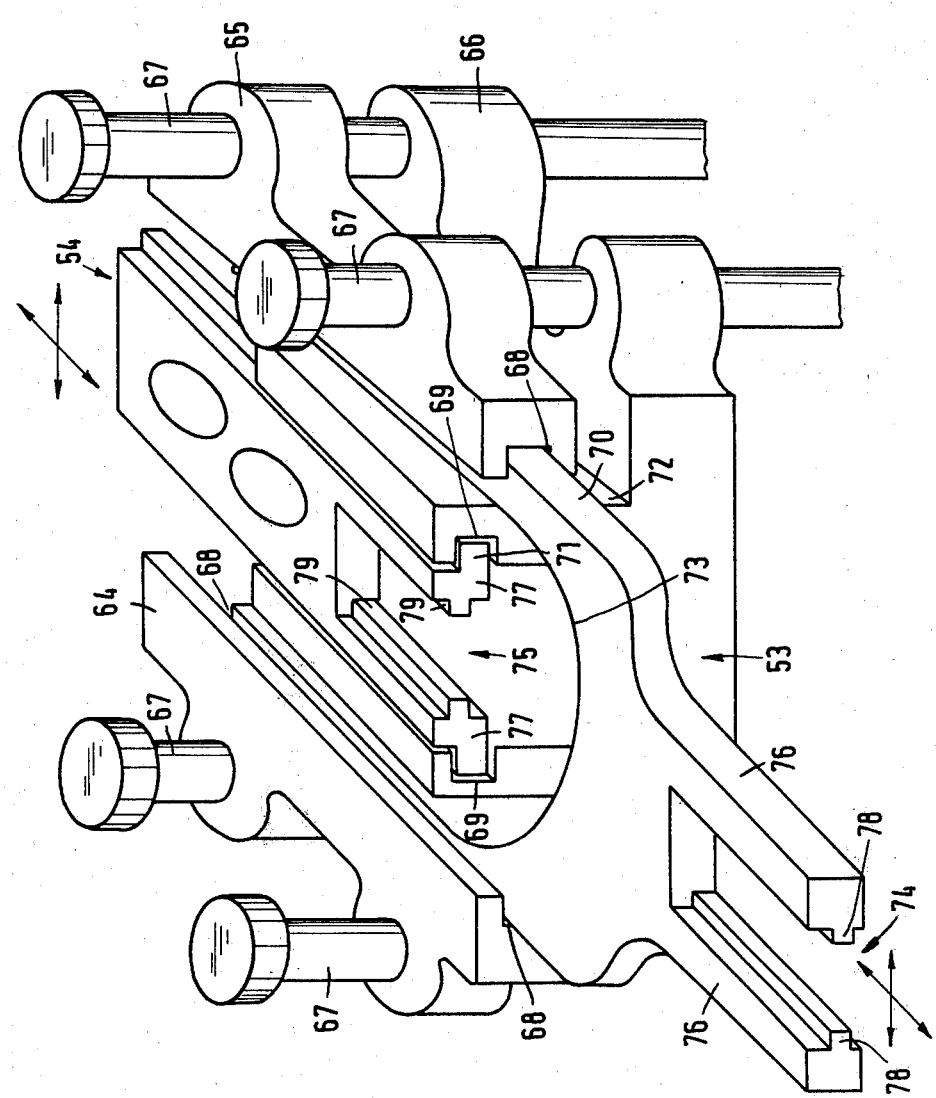

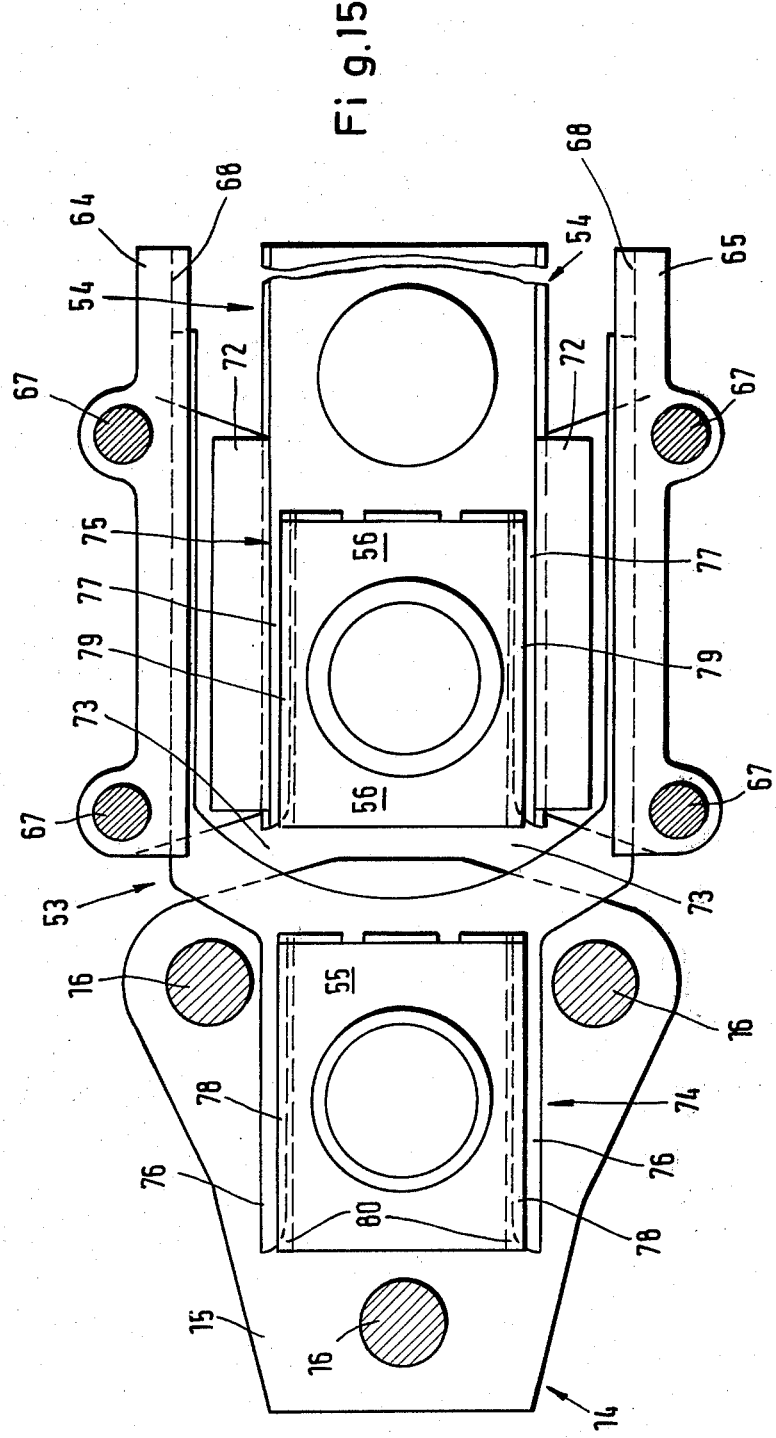

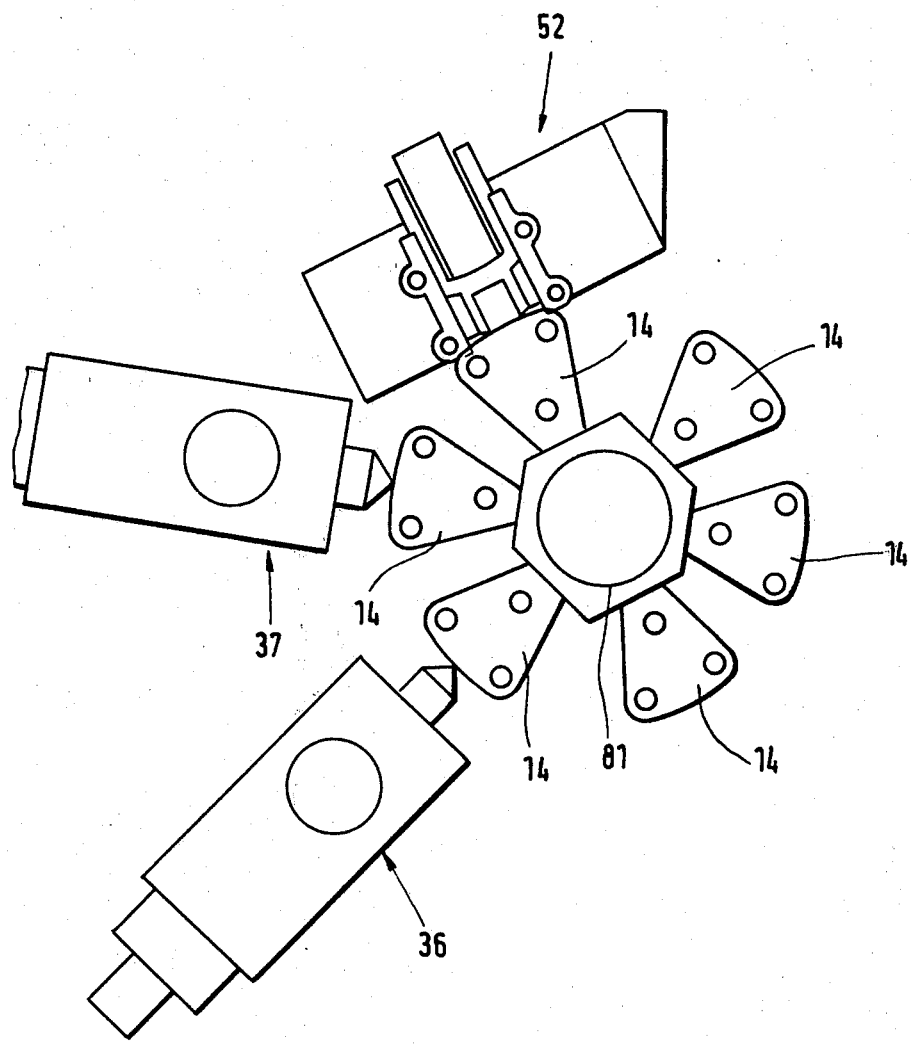

METHOD AND APPARATUS FOR MAKING TWO COMPONENT MOULDINGS

BACKGROUND OF THE INVENTION

This invention relates to a method of and apparatus for making mouldings each comprising at least two moulded components, which in a first working step are each separately moulded and pre-hardened, for example by injection-moulding and pre-vulcanisation of rubber materials, and in a second working step are put together and hardened, especially finally vulcanised, with one another.

In various technical fields, mouldings of elastic, mouldable material, for example rubber or synthetic plastics material, are required which by reason of their configuration or properties of the material must be assembled from two or more moulded components. This requirement arises in the case of shoe soles comprising an inner or intermediate sole of cheaper or softer material facing the shoe upper and an outer sole of harder or abrasion-resistant material. Another example is "Tyton" sealing rings for pipe couplings and the like, which must have a higher elasticity in one partial zone and a higher degree of shape stability in another cross-sectional zone.

In the processing of rubber materials it is desirable to produce mouldings of this kind from moulded components in a manner in which firstly the moulded components are manufactured with partial consolidation, especially pre-vulcanisation, and then in a further working step connected with one another and hardened or finally vulcanised.

For the production of hollow bodies closed upon themselves, such as tires, inner tubes, etc., of elastomer materials, an apparatus is known in which by appropriately formed component moulds and a separator plate arranged between them, in a first working step two half mouldings are formed and pre-vulcanised. Then the separator plate between the component moulds is extracted and these are brought together until they abut. The half mouldings, now likewise abutting on one another, are pressed together, thereby becoming connected with one another and vulcanised out to form a closed moulding. During the first working step the material is fed to the two component mould pockets through an injection passage system simultaneously by one common injection unit. Accordingly, this known apparatus is not suitable for the production of mouldings of materials of different natures. Furthermore its output capacity is unsatisfactory (German DTOS No. 2,156,396).

SUMMARY OF THE INVENTION

The invention is intended to provide an improved method of and apparatus for the production of mouldings from two or more moulded components by which such mouldings can be produced with high output, with satisfactory quality, especially with clear limitation of the durably interconnected moulded components, even in the case of different moulded component materials.

According to the invention there is employed a method of making mouldings each comprising at least two moulded components which in a first working step are each separately moulded and pre-hardened, for example by injection-moulding and pre-vulcanisation of rubber materials, and in a second working step are put together and hardened or vulcanised with one another, characterised in that in one common mould-holding device (press), during its closure step the two moulded components (ring parts) are produced and also two previously produced moulded components are connected with one another.

The moulded components are preferably produced and pre-vulcanised by injection-moulding of rubber or similar materials in appropriate component mould pockets. At the same or staggered times, but during a cohering closure step of the press, two previously produced component mouldings are placed against one another in the same apparatus, and thus connected with one another and finally vulcanised.

Accordingly the invention retains the advantage of the separate production of the individual mouldings—especially from materials having different properties. The "final moulding" formed therefrom is satisfactory in quality, especially due to the clean limitation of the moulded components from one another, nevertheless with a durable connection. Although thus involving two working steps, namely two opening steps of the mould-holding device (press) are necessary for one moulding, the invention achieves the object that a finished moulding can be taken from the mould each time the mould is opened.

The invention further provides a moulding apparatus for making mouldings comprising at least two mutually connected moulded components of mouldable material, for example rubber, having a mould-holding press accommodating at least two component moulds, where the moulded components in a first closure step of the press can be produced each in mutually separated component pockets of the mould, for example by injection-moulding, and in a second closure step are connected with one another by bringing together the component pockets, characterised in that moulds with pockets for at least four components are arranged in a common press in a manner in which each two component pockets forming a moulding complement one another and two further, mutually separated, component pockets are connectable to injection moulding units.

The mould-holding device is of substantially conventional construction and accommodates an injection mould of special configuration for carrying out the method according to the invention. Several component moulds are formed on both sides with pockets which according to relative position serve together with a covering, for example an upper plate or under plate, for the production of only one moulded component, or alternately with component pockets facing one another and complementing one another—each with moulded components—serving for the completion of the moulding. The construction of the mould is thus simple in design in comparison with conventional injection moulds.

At every opening of the press of the component moulds are in a known manner moved apart and at least some of them are taken out of the press and exchanged with one another as regards their relative position, and in each case a finished moulding is removed. The component pockets thus becoming free serve to receive moulded components during the next working step.

The invention further includes the provision of a mould part changer formed in a particular manner. This is associated with the mould-holding device and formed so that the component moulds can be moved past one another with the press opened.

BRIEF DESCRIPTION OF THE DRAWINGS

FIG. 14 shows a mould part changer in perspective representation, FIG. 15 shows a horizontal section through a mould-holding device including a mould part changer, and FIG. 16 shows an injection-moulding installation having a plurality of mould-holding devices arranged on a turntable, in plan view.

DETAILED DESCRIPTION OF THE PREFERRED EMBODIMENTS

Figure 1:
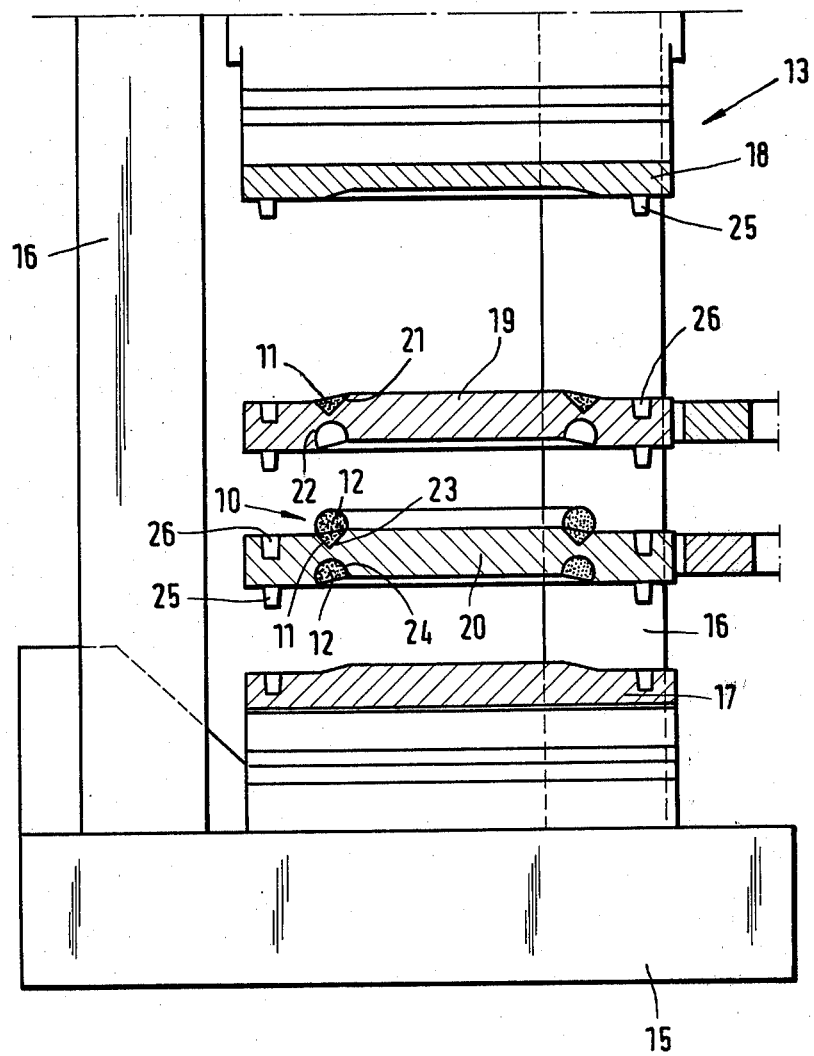
FIG. 1 shows part of a mould-holding device in lateral elevation with an opened injection mould in vertical section and details of a mould part changer.

The examples illustrated in the drawings relate to the production of mouldings in two parts or consisting of two materials of different natures.

FIG. 1 shows sealing rings 10 having a ring part 11 of harder material and a ring part 12 of softer material, namely rubber. The moulded components 11 and 12 are each separately manufactured by injection-moulding and pre-vulcanisation. In a further working step the sealing ring 10 is produced by connection of the ring parts 11, 12 and common completion of vulcanisation.

For this purpose according to FIG. 1 an injection mould 13 is accommodated within a press 14 of substantially conventional formation, whose lower pedestal 15 is shown. In this pedestal three upright tie rods 16 are arranged in distribution. The multi-part mould 13 is arranged between these tie rods 16, which connect the pedestal 15 with an upper cross-head (not shown).

A lower plate 17 is arranged as a non-displaceable lower mould part on the pedestal 15. An upper plate 18 forms the upper counter-part. The latter is connected through intermediate beams with a hoist device (not shown in detail) which is usually hydraulic. With this device the press 14 can be opened and closed with appropriate application of pressure. FIG. 1 shows the opened position of the press 14 with the upper plate 18 in the upper end position.

In the present example two component moulds 19 and 20 are accommodated between the lower plate 17 and upper plate 18. These moulds are formed in a special manner. The moulds 19 and 20 of plate form are provided on each of their mutually opposite sides with a component mould pocket 21, 22 and 23, 24. The pockets are of different formations and each serves to accommodate a ring part 11 or 12.

The moulds 19, 20 are arranged in the press 14 and the pockets 21-24 are arranged in the moulds in such a way that at each working step different pockets 21 and 24 are directed outwards or upwards and downwards, and two further pockets 22 and 23 face one another. The latter supplement one another when the moulds 19 and 20 rest closely on one another.

When the press 14 and injection mould 13 are closed, the upper and lower pockets 21 and 24 are upwardly and downwardly closed respectively by the upper plate 18 and the lower plate 17. The material is now introduced into these pockets through injection passages (which are not shown in detail) and pre-vulcanised. Thus, in these pockets 21 and 24 a ring part 11 and a ring part 12 are produced simultaneously or during one closure step of the press 14, and brought into a relatively stabilised form.

During the same closure step of the press 14, the ring parts 11 and 12 produced in a preceding working step are pressed against one another in the pockets 22 and 23 and connected together by the completion of their vulcanisation.

When the press 14 is then opened, a finished sealing ring 10 can be taken from the injection mould 13. At the same time the pre-vulcanised ring parts 11, 12 from the pockets 21 and 24 are available for the production of a sealing ring 10 in the next closure step of the press.

For this purpose with the press 14 opened and the parts of the injection mould 13 lifted away from one another, the moulds 19 and 20 are exchanged with one another as regards their relative position, so that the mould 19 assumes the lower position and the mould 20 the upper position. Now the operations of "injection-moulding" and "vulcanising together" can be repeated. The exact position of the parts of the injection mould 13 in relation to one another is guaranteed by a number of centering bolts 25 which in the closed position each enter a centering opening 26 of the adjacent mould part.

Figure 2:
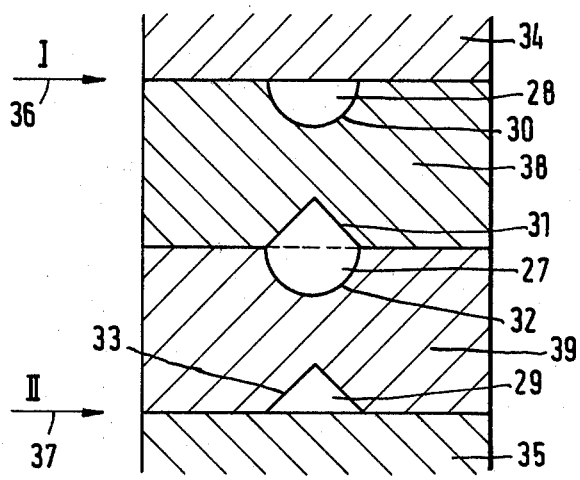
FIGS. 2 to 4 show three different embodiments for the configuration and arrangement of component moulds, in greatly simplified vertical section.
Figure 3:
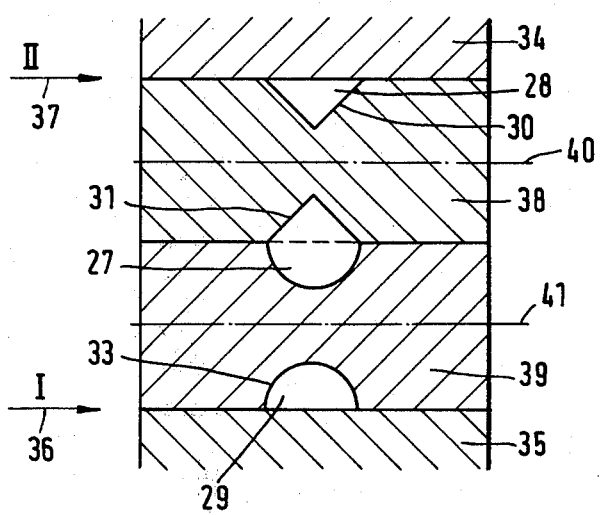
Figure 4:
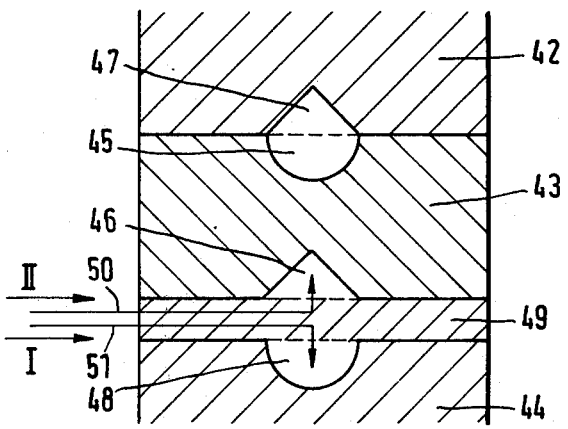

Greatly simplified FIGS. 2 to 4 show possible alternative configurations and handling, with the object of producing two moulded components and completing one moulding during each closure step of a press (not shown in detail).

The mould according to FIG. 2 reproduces substantially the assembly and manner of operation of the injection mould 13 in the example according to FIG. 1, with reference to a moulding 27, represented merely as a geometrical figure, consisting of a semicircular component 28 and a triangular component 29. These are produced in correspondingly formed mould pockets 30, 31, 32, 33, for example by injection-moulding. The downwardly and upwardly facing pockets 30 and 33 are covered by upper plate 34 and lower plate 35. Injection units 36 and 37 allocated to the mutually separate pockets 30 and 33 are shown diagrammatically by arrows. The moulds 38, 39 accommodating the pockets 30-33 are moved exclusively in translation in the alternate exchange movements.

The injection mould according to FIG. 3 has in principle the same assembly as that according to FIG. 2, however the moulds 38, 39 are rotatable about their own transverse axes 40 and 41 with the injection mould opened. In order to achieve the above-described manufacturing course, the pockets 30, 31 and 32, 33 formed on the mutually opposite sides of each mould 38 and 39 are in each case of the same formation.

The injection mould according to FIG. 4 consists of three component moulds 42, 43 and 44. The inner or middle mould 43 is provided with pockets 45 and 46—of different formations—on mutually opposite sides. The upper and lower moulds 42 and 44 each have on the side facing the middle mould 43 a pocket 47 and 48 respectively adapted to the adjacent pocket 45 and 46 respectively.

The production of individual moulded components takes place with the use of a separator plate 49. This is inserted in alternation between the moulds 42 and 43 or 43 and 44. The other moulds in each case lie against one another for the completion of a moulding.

Injection-moulding passages 50 and 51 for the supply of the pockets 46 and 48 are provided in the separator plate 49. This separator plate 49 can be brought alternately between the component moulds 42-44 by appropriate movement. It is also possible to provide two separator plates which are introduced in alternation at the same height each time.

For the execution of the movements of the moulds 19 and 20 of the injection mould 13 according to FIG. 1 or of the moulds 38 and 39 according to FIG. 2, a special mould part changer 52 can be applied to the press 14. This mould part changer, represented in detail in FIGS. 14 and 15, is equipped with mould carriers 53 and 54 for each component mould.

FIGS. 5 to 13 show the complete course of movement of two component moulds 55 and 56 and of the mould carriers 53, 54 pertaining thereto, in combination with a shoe sole mould 57. The moulds 55, 56 are equipped with pockets 58, 59, 60 and 61, two each for an inner sole and two each for an outer sole.

Figure 5:
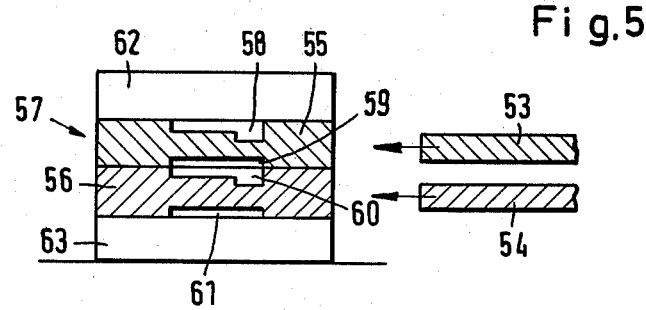
FIGS. 5 to 13 show the component moulds of a greatly simplified injection-mould including a mould carrier of a mould part changer in the different positions during the production of two-part mouldings such as shoe soles.

FIG. 5 shows the initial position with sole mould 57 closed and mould carrier 53, 54 of the mould part changer 52 retracted.

Figure 6:
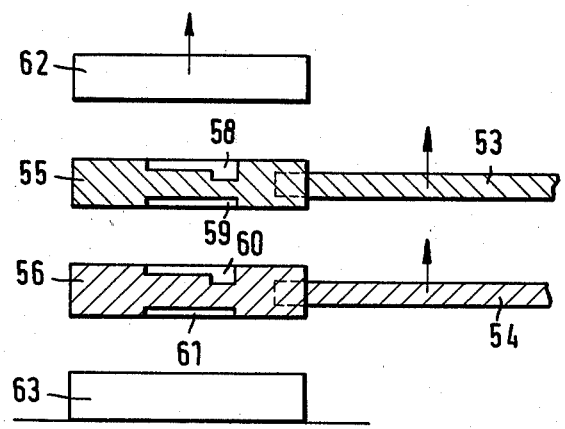

The next working step can be seen from FIG. 6, wherein the mould 57 is opened by lifting away the upper plate 62. The moulds 55 and 56 initially remain lying on the lower plate 63. In the position according to FIG. 5 the carriers 53, 54 enter the mould 57 and each accommodates an associated component mould 55, 56. These are now lifted away from the lower plate 63 and from one another by upward movement of the mould carriers 53, 54.

Figure 7:
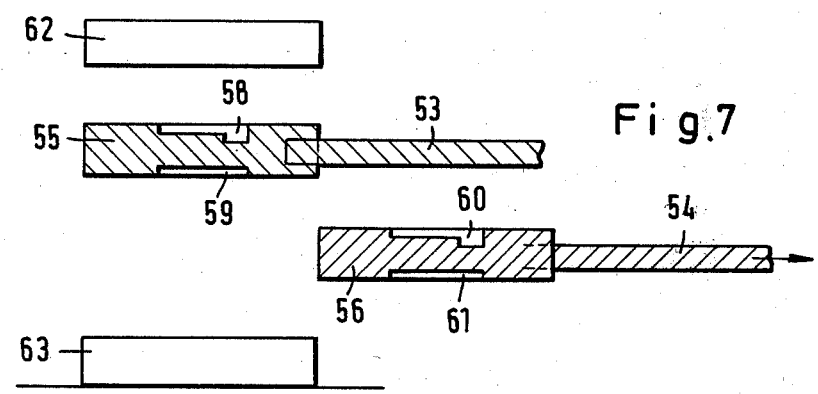
Figure 8:
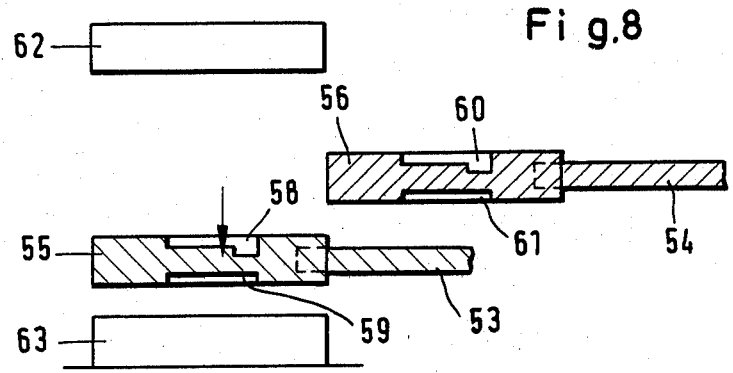
Figure 9:
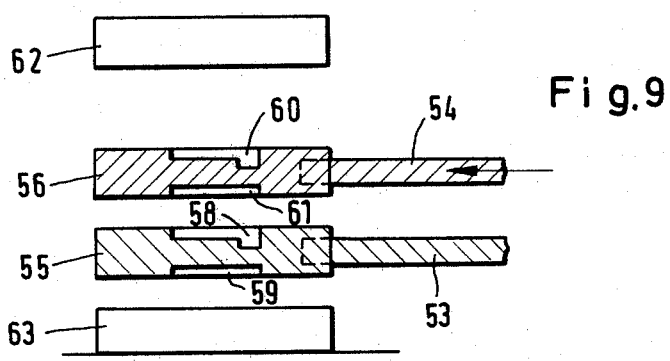
Figure 10:
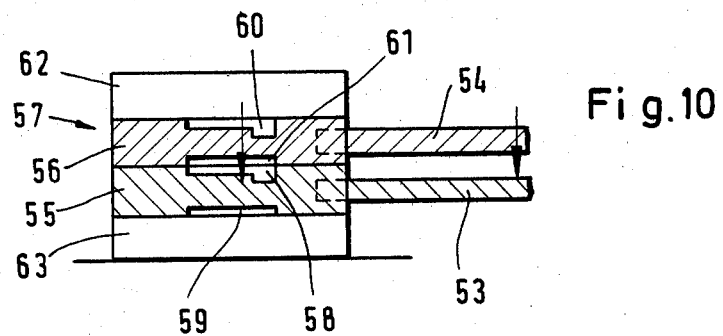
Figure 11:
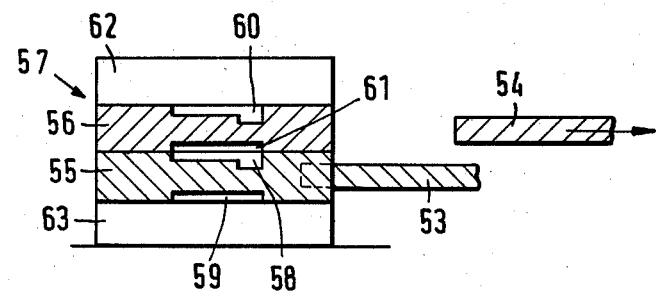

Next the lower mould 56 is moved out by appropriate movement of the carrier 54 (FIG. 7). The upper mould 55 remaining is then moved downwards by appropriate movement of the carrier 53 (FIG. 8), namely to a plane beneath the mould 56. The latter is then driven back into the sole mould 57 by advancing the carrier 54 (FIG. 9). The two carriers 53 and 54 with the moulds 55 and 56 are then moved downwards until they abut one another and on the lower plate 63. At the same time the upper plate 62 is moved downwards so that the sole mould is again closed in FIG. 10, but with a changed sequence of the component moulds.

Figure 12:
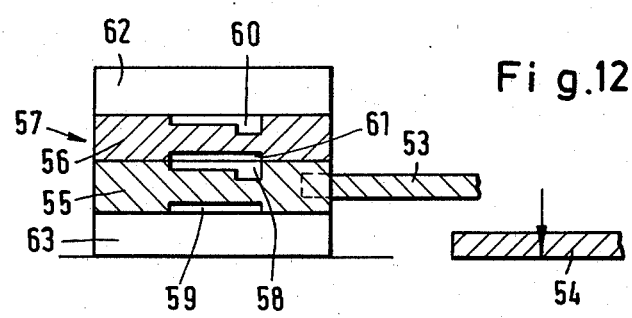
Figure 13:
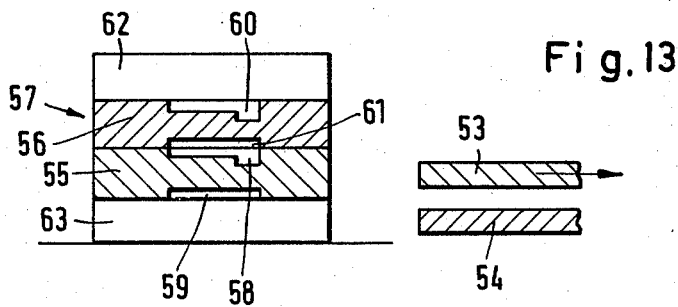

The mould carrier 54 is now retracted (FIG. 11) and then moved downwards into its initial position (FIG. 12). Now the carrier 53 is also drawn back into its initial position (FIG. 13). At the beginning of a next opening step of the sole mould 57 the carriers 53 and 54 are first moved upwards again to the level of the associated component moulds 55 and 56 (FIG. 5).

The mould part changer 52 must be formed so that the carriers 53 and 54 can be moved past one another during the changing movement of the mould part. The present mould part changer 52 according to FIGS. 14 and 15 is formed so that the originally lower mould carrier 54 can be driven, when an upper mould carrier 53 is applied to the mould part, past this carrier into an upper position.

As may be seen from FIG. 14, the carriers 53 and 54 are displaceably guided in upper and lower bearing pieces 64, 65 and 66. Two laterally extending elongated bearing pieces 64 and 65 are allocated to the carrier 53 which is upward in the original position, while the carrier 54 is borne by a lower, single bearing piece 66. The bearing pieces are mounted on four upright columns 67, and are each individually movable upwards and downwards on the columns by a pressure cylinder (not shown).

The carriers 53, 54 are each horizontally displaceably mounted and guided in grooves 68 and 69 facing one another in the bearing pieces by an edge 70 and an angled-off flange 71, respectively.

Each carrier 53 and 54 is displaceable horizontally into the press 14 and back by a pressure-medium cylinder (not shown).

In FIG. 14 the carrier 54 of the lower bearing piece 66 is mounted on a pedestal 72 of the latter. This pedestal is of such transverse dimensions that it is capable of passing through an aperture 73 formed in the carrier 53. This aperture 73 is open to the rear, on the side opposite the press 14.

In height the pedestal 72 is dimensioned so that in an upper position of the bearing piece 66 the pedestal, with the carrier 54, protrudes upwards through the aperture 73 in such a way that the carrier 54 assumes a vertical distance from the carrier 53 sufficient for the exchange movements. The carrier 53 is in this case situated in the end position facing the press 14.

The free ends of the carriers 53, 54 which are movable out of the region of the bearing pieces 64-66 are provided with mould mountings 74 and 75 of forked or U-form, having arms 76 and 77 laterally embracing the component moulds. These arms are equipped with guides 78 and 79 which again cooperate with counter guide grooves 80 of the component moulds. During the driving of the mould mountings 74, 75 into the press 14, the guides 78, 79 enter the grooves 80 of the associated component mould, which is thus suspended by its own weight on the mould mounting 74 or 75. The relevant component mould, provided that the press is opened, can now be moved upwards and downwards and drawn out of the region of the press 14. In the FIG. 15 position the carrier 53 is situated with mould 55 in the region of the press 14, while the carrier 54 with mould 56 is retracted out of the press so far that upward movement through the aperture 73 is possible.

The devices described can be parts of an injection-moulding installation such as is illustrated diagrammatically in FIG. 16. Here several presses 14 are arranged at equal circumferential intervals on a turntable 81. The presses 14 and the injection moulds accommodated therein are applied sucessively to non-displaceable injection units 36 and 37. These introduce material into the mutually separated component mould pockets, for example 21 and 24. After a further rotating step of the turntable the press 14 comes into the region of the mould part changer 52. Here the above-described changes of position of the component moulds take place. A working or closure step, that is a working phase during which the press 14 remains closed, extends over several movement steps of the turntable.

In the embodiments described with reference to FIG. 1 and FIGS. 5 to 13, in each case only one component mould is moved out of the press. The finished moulding will expediently be fixed on that component mould which is moved out of the press, whereby the operation of removal from the mould is facilitated.

What is claimed is:

1. An injection moulding apparatus for manufacturing a composite article of rubber or the like comprising first and second components thermally joined together by vulcanizing or the like, comprising:

(a) a mould press having two substantially parallel, mutually displaceable end plates movable toward each other to close the press and vice versa, (b) means defining a cavity in a first one of said end plates corresponding to the shape of the first component, (c) means defining a cavity in a second one of said end plates corresponding to the shape of the second component, (d) a planar mould plate having a first cavity defined in one surface thereof corresponding to the shape of the first component and a second cavity defined in another, opposite surface thereof corresponding to the shape of the second component, (e) a planar separator plate, (f) means for aligning the mould plate and the separator plate between the end plates in a stacked, mutually cooperable, juxtaposed manner to structurally define, upon the closure of the press, three separate mould chambers corresponding respectively to the shape of the first component, the shape of the composite article, and the shape of the second component, and (g) means for interchanging the relative positions of the mould plate and the separator plate to simultaneously produce separate first and second components and a composite article formed of two previously moulded first and second components during a single closure operation of the mould press.

2. A moulding apparatus according to claim 1, wherein injection-moulding passages (50, 51) are formed in the separator plate (49) and lead to mould chambers (46, 48) lying thereabove and therebeneath.

3. An injection moulding apparatus for manufacturing a composite article of rubber or the like comprising first and second components thermally joined together by vulcanizing or the like, comprising:
(a) a mould press having two substantially parallel, mutually displaceable end plates movable toward each other to close the press and vice versa,
(b) two planar mould plates each having a pair of cavities individually defined in opposite surfaces thereof corresponding to the shapes of the first and second components,
(c) means for aligning the mould plates between the end plates in a stacked, mutually cooperable, juxtaposed manner to structurally define, upon the closure of the press, three separate mould chambers corresponding respectively to the shape of the first component, the shape of the composite article, and the shape of the second component, and
(d) means for reversing the relative positions of the two mould plates to simultaneously produce separate first and second components and a composite article formed of two previously moulded first and second components during a single closure operation of the mould press.

4. A moulding apparatus according to claim 3, wherein:
(a) each mould plate has a first cavity in one surface corresponding to the shape of the first component and a second cavity in another, opposite surface corresponding to the shape of the second component, and said first and second components having different shapes
(b) the means for reversing interchanges the relative positions of the two mould plates.

5. A moulding apparatus according to claim 3, wherein:
(a) a first one of said mould plates has cavities in each of its opposite surfaces corresponding to the shape of the first component,
(b) a second one of said mould plates has cavities in each of its opposite surfaces corresponding to the shape of the second component, and
(c) the means for reversing rotates each mould plate through 180°.

6. A moulding apparatus according to claim 3, wherein a plurality of mould presses are arranged on a common turntable (81) and can be indexed in succession to non-displaceable injection units (36, 37) and to at least one non-displaceable mould plate reversing means (52).

7. A moulding apparatus according to claim 3, wherein the means for reversing is operable to withdraw a mould plate in a lower initial position out of the press, move it upwardly outside the press, and insert it back into the press, and to move the other mould plate downwardly within the press, or vice versa.

8. A moulding apparatus according to claim 7, wherein the composite article produced is carried by the mould plate withdrawn from the press.

9. A moulding apparatus according to claim 3, wherein the mould plate reversing means (52) comprises two mould carriers (53, 54) mounted outside the press, each accommodating one mould plate, the mould carriers being mutually independently movable both in the vertical direction and horizontally into and out of the press.

10. A moulding apparatus according to claim 9, wherein the mould carriers (53, 54) are movable in the vertical direction past one another without contact.

11. A moulding apparatus according to claim 10, wherein the mould carriers (53, 54) are mounted one above the other on bearing pieces (64, 65; 66) for displacement on common upright carrier columns (67).

12. A moulding apparatus according to claim 11, wherein the bearing piece (66) of a lower mould carrier (54) is formed with an elevated pedestal (72) of the reception of the mould carrier, and said pedestal is movable through an aperture (73) of the other mould carrier (53).

13. A moulding apparatus according to claim 12, wherein the mould carriers (53, 54) are of plate form and are displaceably mounted and guided in lateral grooves (68, 69) of the bearing pieces and of the pedestal.

14. A moulding apparatus according to claim 13, wherein the mould carriers (53, 54) have forked ends which laterally engage grooves in the mould plates.

15. A moulding apparatus according to claim 14, wherein the mould plates are held by their own weight in the forked ends of the mould.

* * * * *